United States Patent [19]

Schmidt et al.

[11] Patent Number: 4,767,082
[45] Date of Patent: Aug. 30, 1988

[54] DUAL MODE SEAT BELT RETRACTOR ASSEMBLY

[75] Inventors: Timothy J. Schmidt, Troy; Ronald A. Heintzleman, Sterling Heights, both of Mich.

[73] Assignee: General Safety Corporation, St. Clair Shores, Mich.

[21] Appl. No.: 96,964

[22] Filed: Sep. 15, 1987

Related U.S. Application Data

[63] Continuation of Ser. No. 788,021, Oct. 16, 1987, Pat. No. 4,726,539.

[51] Int. Cl.⁴ ............................................. B60R 22/40
[52] U.S. Cl. ........................ 242/107.4 A; 242/107.4 R
[58] Field of Search ................... 242/107.4 R, 107.4 A, 242/104.4 D, 107.7; 280/806; 297/478

[56] References Cited

U.S. PATENT DOCUMENTS

| | | | |
|---|---|---|---|
| 4,008,881 | 2/1977 | Ross | 254/369 |
| 4,143,831 | 3/1979 | Cunningham | 242/107.4 A |
| 4,436,255 | 3/1984 | Matsui et al. | 242/107.4 A |
| 4,518,132 | 5/1985 | Schmidt | 242/107.4 A |
| 4,552,319 | 11/1985 | Gavagan et al. | 242/107.4 A |
| 4,555,075 | 11/1985 | Schmidt et al. | 242/107.4 A |
| 4,566,649 | 1/1986 | Peterson | 242/107.4 A |
| 4,573,646 | 3/1986 | Willey | 242/107.4 A |
| 4,583,701 | 4/1986 | Matsui et al. | 242/107.4 A |
| 4,597,546 | 7/1986 | Yamamoto et al. | 242/107.4 A |

*Primary Examiner*—John M. Jillions
*Attorney, Agent, or Firm*—Harness, Dickey & Pierce

[57] ABSTRACT

This invention relates to a seat belt retractor for a motor vehicle which can be operated in an emergency locking mode wherein belt retraction is prevented only upon vehicle deceleration, or in an automatic locking mode where the retractor operates as a one-way clutch to inhibit belt withdrawal. A mode switching mechanism is provided which causes the operating mode of the retractor to change when the seat belt webbing is either fully extended or fully retracted. The mode switching mechanism employs a rotating actuator ring gear having one or more tabs which engage an actuator lever which is caused to move between two positions. In one position of the actuator lever, the locking bar of the retractor is urged into engagement with the toothed sprockets of the retractor causing the retractor to operate in the automatic locking mode. In the other position of the actuator lever, biasing of the locking bar is relieved so that the retractor operates in the emergency locking mode. The design according to this invention provides wide flexibility in terms of packaging of the retractor and is easily modified to accomodate various lengths of seat belt webbing.

17 Claims, 4 Drawing Sheets

DUAL MODE SEAT BELT RETRACTOR ASSEMBLY

This is a continuation of patent application Ser. No. 788,021, filed 10/16/85, now U.S. Pat. No. 4,726,539.

BACKGROUND AND SUMMARY OF THE INVENTION

This invention relates to a motor vehicle seat belt retractor and particularly to a retractor which can be operated either in emergency locking or automatic locking modes.

Most motor vehicles are equipped with seat belt systems which, when used, restrain the occupants when the vehicle is subjected to high rates of deceleration which may occur during a collision. Many seat belt retractor designs are of the so-called emergency locking type. These retractors employ an inertia sensitive actuator which prevents seat belt webbing from being withdrawn from the retractor when the vehicle is subjected to deceleration forces above a predetermined level, thereby restraining the vehicle occupant. During normal conditions, however, the seat belt webbing may be freely withdrawn from the retractor, providing the occupants with freedom of movement.

Another type of seat belt retractor is often referred to as an automatic locking retractor. These retractors act as a one-way clutch in that once withdrawal of the belt webbing is stopped, further withdrawal of the webbing is prevented. When, however, the seat belt is unfastened and the webbing is fully retracted within the retractor, the webbing can again be withdrawn to the desired extent. These types of retractors firmly restrain the occupant since webbing cannot be withdrawn and therefore restrict freedom of movement of the occupant.

The emergency locking retractor design has many advantages in terms of occupant comfort and convenience since they permit free movement of the occupants until the vehicle is subjected to deceleration forces above a predetermined level. Emergency locking retractors have been found undesirable, however, when they are used to fasten a child restraint system within the vehicle. For this application, it is preferred that the seat belt system firmly and securely anchor the child restraint system to the vehicle. Since automatic locking retractors do not permit free withdrawal of webbing, they are preferably for restraining child restraint systems. In addition, certain segments of the public experience a lack of confidence as to the operation integrity of seat belt retraction mechanisms of the emergency locking type.

Due to the conflicting needs of providing adult occupant comfort and convenience, and securely fastening child restraint systems within vehicles, it is desirable to provide a dual mode seat belt retractor which may be converted between emergency locking and automatic locking operating modes in accordance with the needs of the user. It is therefore a principal object of this invention to provide such a dual mode seat belt retractor. It is a further object of this invention to provide a dual mode retractor which is easily switched between operational modes. It is yet another object of this invention to provide a dual mode seat belt retractor which is simple in design and inexpensive to produce.

In U.S. Pat. No. 4,555,075, entitled "Dual Mode Seat Belt Retractor Assembly", and assigned to the assignee of this application, a retractor fulfilling the above-described objects is disclosed. That retractor design, however, has somewhat limited adaptability to various motor vehicle designs and retractor placements since the inertia sensitive pendulum is mounted near the center of the retractor, rather than at either end thereof. The placement of the pendulum is restricted for that design since the emergency and automatic mode switching mechanism is attached to one end of the retractor, and the retractor rewind spring is connected to the other end of the retractor. Furthermore, the retractor according to the above-cited U.S. Patent is not easily adapted for seat belt webbings having various lengths since the number of rotations of the retractor spool between the points at which the operating mode is switched is relatively difficult to adjust. It is therefore another object of this invention to provide a dual mode retractor which provides greater flexibility in the mounting location of the inertia sensitive pendulum actuator, and further, one that enables the retractor to accommodate various lengths of belt webbing without major modifications.

The above objects of this invention are provided by a retractor design which includes a mechanism positioned at one end of the retractor for switching the retractor between operational modes. The mode switching mechanism includes a drive gear which causes a ring gear to rotate with rotation of the retractor spool. Extending tabs are provided on the ring gear which interact with a mode switching lever which, in one position, biases a locking bar into engagement with toothed sprockets of the spool such that the retractor operates as an automatic locking retractor. When the mode switching lever moves to another position, it disengages the locking bar so that the retractor functions as an emergency locking retractor. The retractor rewind spring assembly is preferably stacked directly on the housing which encloses the mode switching mechanism. Accordingly, a retractor is provided having one opened end which can be used to mount the inertia sensitive pendulum and associated components. The retractor according to this invention is easily modified to accommodate various webbing lengths merely by changing the point at which the ring gear tabs protrude from the ring gear.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE INVENTION

Figure 1:
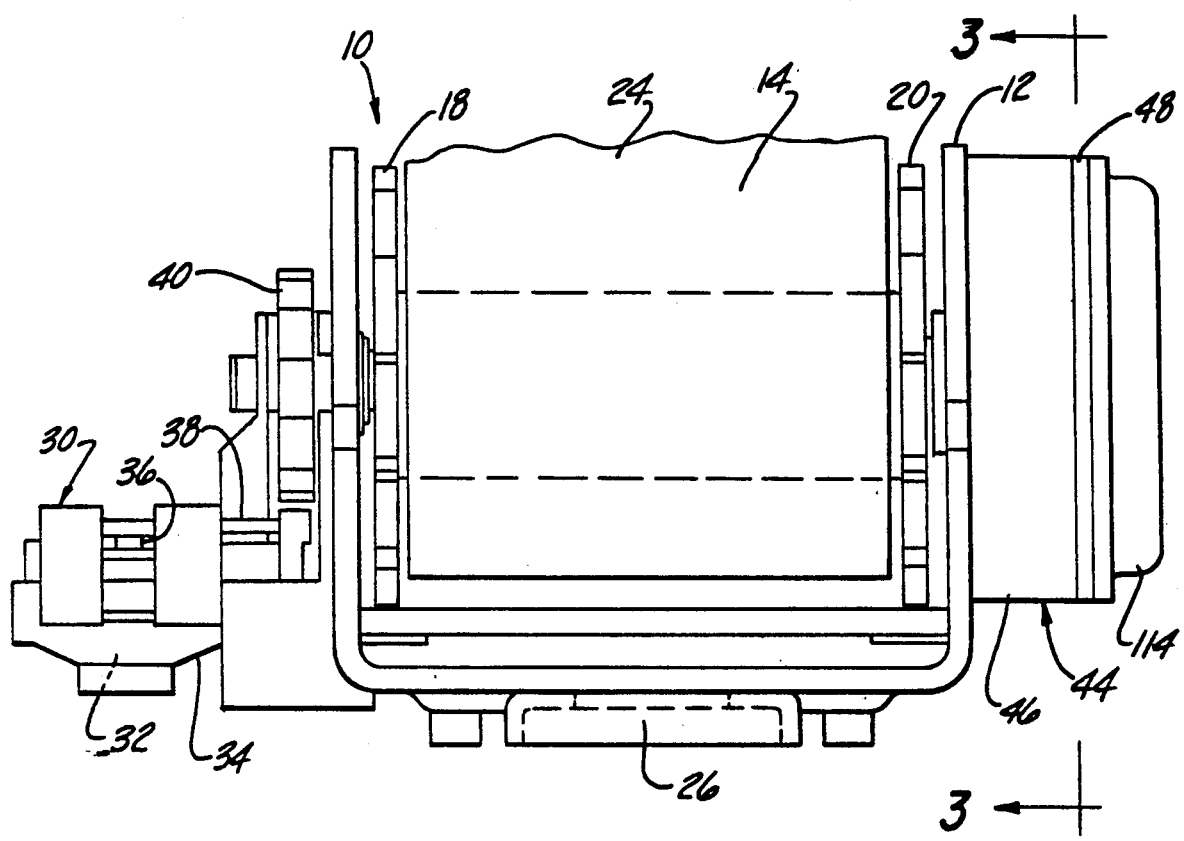
FIG. 1 is a front elevational view of the dual mode retractor according to this invention.

A dual mode seat belt retractor assembly according to this invention is shown in each of the Figures and is generally designated by reference character 10. Retractor assembly 10 includes rotatable spool 14 mounted to retractor frame 12. Spool 14 includes belt support shaft 16 having a pair of radially extending and separated toothed sprockets 18 and 20. One end of seat belt webbing 24 is connected to belt support shaft 16 and becomes rolled thereon as spool 14 is rotated. Retractor frame 12 includes one or more mounting holes 26 for fasteners which permit secure attachment of retractor 10 to the associated vehicle or structure. Rotation of toothed sprockets 18 and 20 in the direction of belt extension (counterclockwise in FIGS. 3 and 4) is selectively arrested through movement of locking bar 28 which is movable between positions of engagement and disengagement with the toothed sprockets.

When retractor 10 is operating in the emergency locking operating mode, locking bar 28 is caused to move between engaged and disengaged positions by inertia sensitive actuator 30 which is positioned at one end of retractor frame 12. Retractor 10 may be provided with any type of inertia sensitive actuator device. Actuator 30 is of prior art design and is briefly described herein for illustration only. Referring to FIG. 1, inertia sensitive actuator 30 includes pendulum 32 which is suspended from actuator frame 34 and moves in response to vehicle acceleration and deceleration (or due to tipping of the retractor from its normal position). The upper portion of pendulum 32 defines a button shaped top 36 which urges locking lever 38 upwardly in response to vehicle deceleration above a predetermined level. Locking lever 38 has a pair of arms (not shown), one for engaging spur gear 40 and another which acts on locking bar 28. Once pendulum 32 becomes tipped due to deceleration, locking lever 38 is raised such that one of its arms engages spur gear 40 which, due to rotation of spool 14 caused by belt extension, causes the other arm of locking lever 38 to urge locking bar 28 into the engaged position. A more complete description of the configuration and operation of elements making up an illustrative inertia sensitive actuator 30 is provided in issued patents, U.S. Pat. No. 4,069,987, issued Jan. 24, 1978, entitled "Inertia Locking Seat Belt Retractor", and U.S. Pat. No. 4,518,132, issued May 21, 1985, entitled "Combination Seat Belt Retractor Mechanism". The above-mentioned patents are hereby incorporated by reference.

In accordance with this invention, mode switching mechanism 44 is mounted to retractor frame 12 at the end of frame 12 opposite inertia sensitive actuator 30. Mode switching mechanism 44 is enclosed by a housing defined by gear retainer 46 and retainer cover 48. Gear retainer 46 is attached to retractor frame 12 and has a central hole 50 through which belt support shaft 16 extends. Gear retainer 46 further defines several pockets including gear train pocket 52 and switching lever pocket 54. Switching lever pocket 54 defines a pair of posts 56 and 58, and a pair of slots 60 and 62. Slot 62 enables end tab 89 of locking bar 28 to be positioned in switching lever pocket 54.

Figure 2:
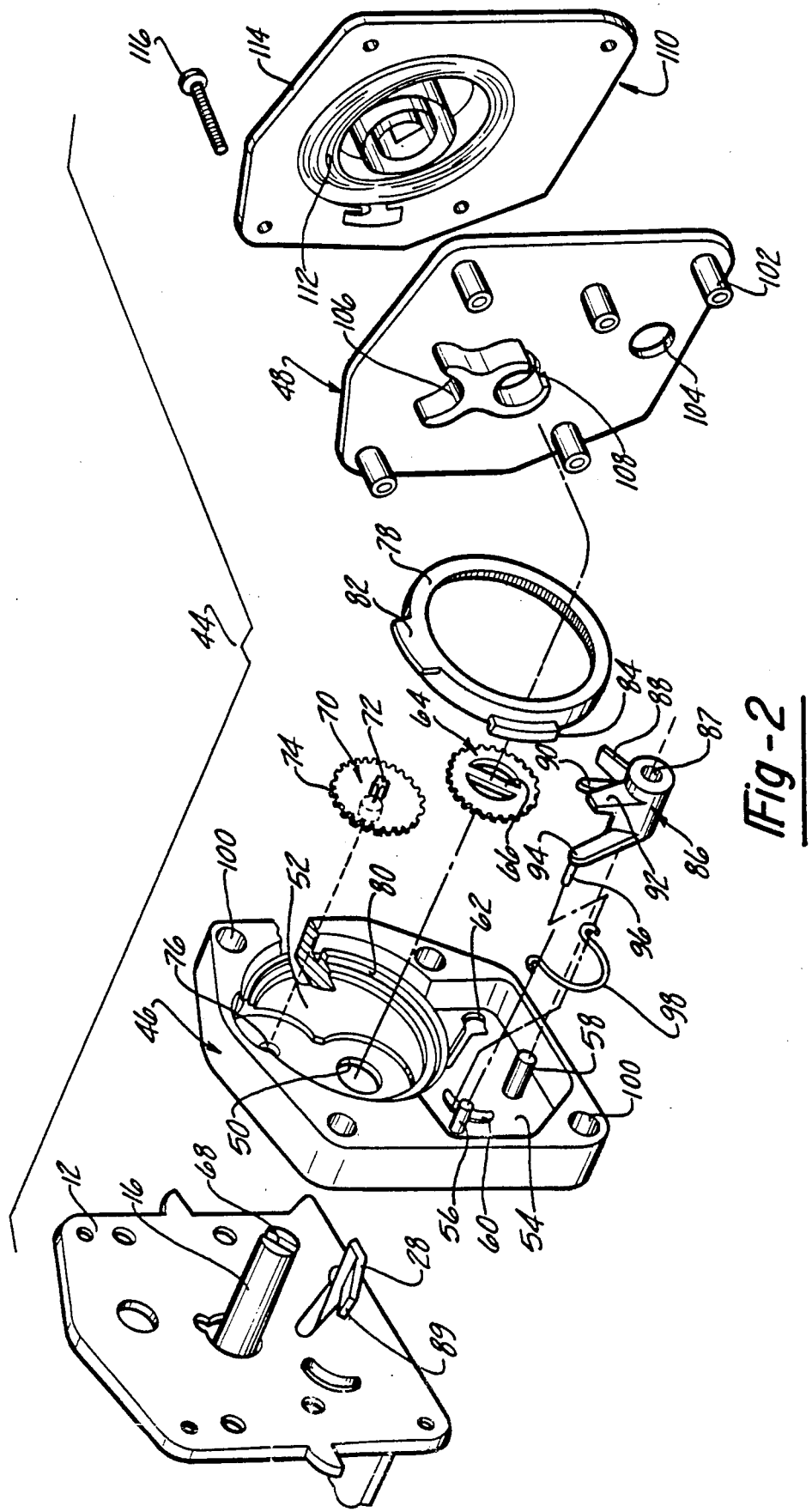
FIG. 2 is an exploded pictorial view of a portion of the retractor frame, the mode switching mechanism, and the rewind spring assembly of the retractor according to this invention.

Drive gear 64 is installed onto belt support shaft 16 for rotation therewith. As shown in FIG. 2, drive gear 64 includes central web 66 which is received by slot 68 of belt support shaft 16 so that rotation of the belt support shaft drives gear 64. Reduction gear 70 defines small toothed portion 72 and large toothed portion 74 which meshes with drive gear 64. Reduction gear 70 is journalled for rotation in bore 76. Ring gear 78 is a relatively large gear having internal teeth and is driven by toothed portion 72 of reduction gear 70. Ring gear 78 is positioned by circular groove 80 within gear retainer 46. The above-described arrangement causes ring gear 78 to rotate with rotation of belt support shaft 16 at a reduced rate and in the opposite rotational direction. Preferably, the number of teeth of gears 64, 70 and 78 are selected such that ring gear 78 undergoes approximately one revolution between full extension and complete retraction of belt webbing 24. Ring gear 78 defines a pair of extending tabs 82 and 84. As best shown in FIG. 2, tabs 82 and 84 may be displaced such that they lie in parallel but spaced apart planes.

Mode switching lever 86 defines a central bore 87 which enables it to be mounted for pivoting movement onto post 58. Mode switching lever 86 includes four extending arms: locking bar arm 88, tab engaging arms 90 and 92, and spring arms 94. Pin 96 on spring arm 94 travels in slot 60 to limit the range of angular motion of mode switching lever 86. As switching lever 86 moves between its extreme positions locking bar arm 88 moves between an emergency locking position and an automatic locking position, corresponding to the operating modes of retractor 10. Mode switching lever 86 is maintained in either the automatic or emergency locking position by switching lever spring 98 having a horseshoe shape with ends engaging pin 96 and post 56. The location of the pivot post 58 for switching lever 86 is such that the extension force exerted by spring 98 is directed on one side of a line between posts 56 and pivot 58 in one position, and the other side thereof in the other mode position. In the automatic locking position, locking bar arm 88 urges end tab 89 of locking bar 28 into engagement with toothed sprockets 18 and 20. Once locking bar 28 engages toothed sprockets 18 and 20, withdrawal of webbing 24 is inhibited. In this operating mode, however, webbing 24 may be retracted since locking bar 28 can "ride up" the teeth of sprockets 18 and 20 when spool 14 is rotated in that direction. Such ratcheting is permitted since mode switching lever 86 can be rotated slightly with movement of locking bar 28 without switching to the emergency locking position. In the emergency locking position, locking lever arm 88 is moved away from locking bar 28 so that the locking bar will engage toothed sprockets 18 and 20 only when urged by inertia sensitive actuator 30.

Retainer cover 48 is adapted to enclose gear retainer 46 and to trap the components therein. Retainer cover 48 includes a plurality of extending bushing shaped posts 102 that are closely received by holes 100 in gear retainer 46. Retainer cover 48 further defines a hole 104 which receives mode switching lever 86. Extending web portion 106 supports belt support shaft 16 and reduction gear 70. Retainer cover 48 further has a centrally disposed hole 108 allowing belt support shaft 16 to extend therethrough.

Rewind spring assembly 110 is comprised of coil rewind spring 112 and cover 114. Cover 114 defines a pocket for attachment of one end of rewind coil spring 112 and the other end of the spring engages slot 68 of belt support shaft 16 to rotatably bias the shaft. Cover 114 becomes attached to mode switching mechanism 44 and retractor frame 12 by threaded fasteners 116. Rewind spring assembly 110 rotationally biases spool 14 to rewind webbing 24 in a conventional fashion. Due to the placement of rewind spring assembly 110 directly stacked on mode switching mechanism 44, greater flexibility in the positioning of inertia sensitive actuator 30 is provided. As described previously, inertia sensitive actuator 30 may be provided at the opposite end of retractor frame 12 from mode switching mechanism 44 or may be located near the midline of spool 14, or at any other location.

Figure 3:
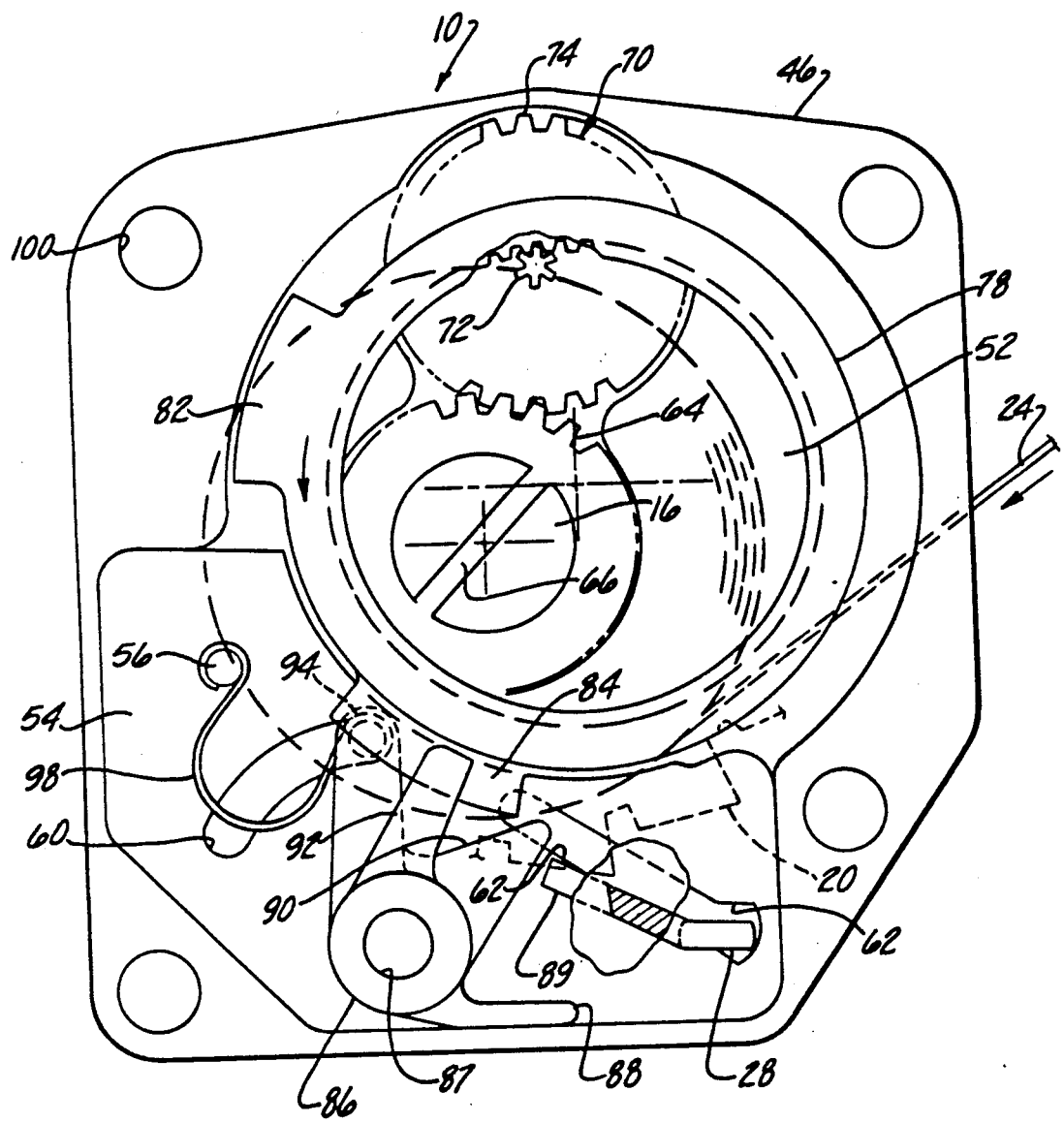
FIG. 3 is a cross-sectional view taken along line 3—3 of FIG. 1 showing the mode switching mechanism at a position causing the retractor to operate in the emergency locking mode.
Figure 4:
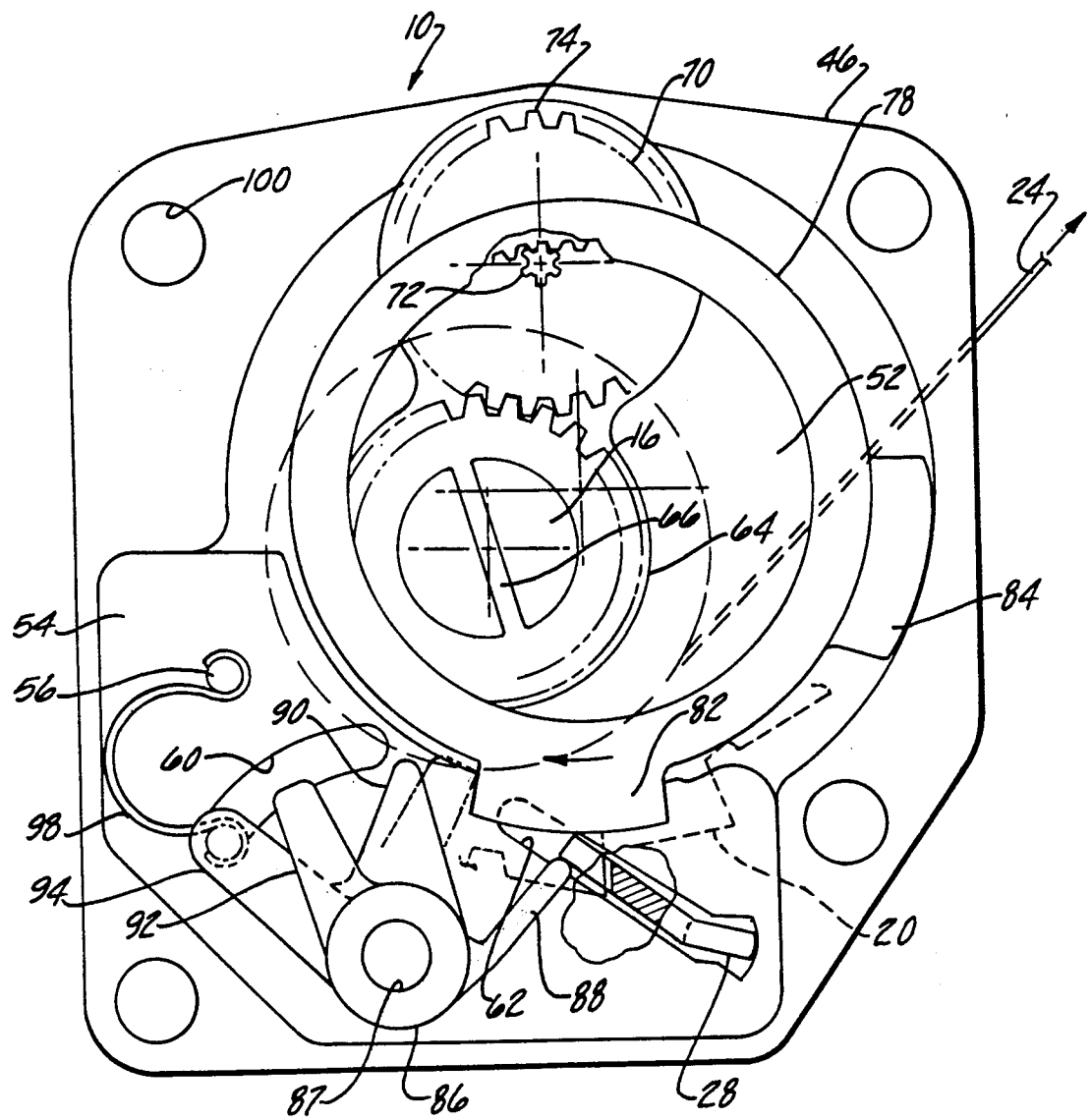
FIG. 4 is a cross-sectional view also taken along line 3—3 showing the retractor according to this invention wherein the mode switching mechanism is in a position causing the retractor to operate in the automatic locking mode.

The operation or mode switching mechanism 44 is best explained with particular reference to FIGS. 3 and 4. FIG. 3 illustrates retractor 10 when webbing 24 is being retracted, causing spool 14 to rotate in a clockwise direction. Such movement of spool 14 causes rotation of ring gear 78 in a counterclockwise direction and at a reduced rate. Upon sufficient rotation, tab 84 engages tab engaging arm 90 of mode switching lever 86, causing the lever to rotate clockwise. Upon sufficient movement, lever 86 moves to its extreme clockwise position, as shown in FIG. 3. Due to the biasing exerted by switching lever spring 98. lever 86 remains in the position shown in FIG. 3 wherein locking lever arm 88 is moved out of engagement with locking bar 28, and consequently, retractor 10 operates in the emergency locking mode. In this operating mode, locking bar 28 moves into engagement with sprockets 18 and 20 only in response to inertia sensitive actuator 30.

FIG. 4 illustrates the operation of retractor 10 during belt extension. Withdrawal of webbing 24 causes spool 14 to rotate in a counterclockwise direction, causing ring gear 78 to rotate in a clockwise direction. Upon sufficient rotation of ring gear 78, tab 82 contacts tab engaging arm 92 of switching lever 86 to rotate the lever in a counterclockwise direction to the position shown in FIG. 4. In that position, locking lever arm 88 acts upon locking bar 28 to cause it to be moved into engagement with the teeth of sprockets 18 and 20, which are shown in phantom lines in that figure. If tension on webbing is relaxed, rewind spring assembly 110 causes belt retraction, which is permitted since locking bar 28 can ratchet between teeth on the sprockets, causing slight rotation of switching lever 86 (but not enough to cause the lever to move to the emergency locking position).

The position at which the above described mode switching action occurs is preferably such that, at near full belt extension, the retractor switches to automatic locking mode as shown in FIG. 4. Upon near full retraction of the belt, retractor 10 returns to emergency locking operation. Therefore, during normal use of retractor 10, when the belt is not fully extended, the user is provided with a retractor which operates in the emergency locking mode. If, however, the user desires the retractor to operate in an automatic locking mode, webbing 24 is fully extended thereby changing the operating mode of the retractor.

Mode switching mechanism 44 easily accommodates various lengths of webbing 24 merely by changing the position of tabs 82 and 84. The tabs may be formed integrally with ring gear 78 or as separate attached components. Further, greater flexibility is provided by enabling ring gear 78 to undergo slightly more than one revolution between its extreme positions. This is achieved by providing tabs 82 and 84 which are offset and similarly offsetting tab engaging arms 90 and 92 of switching lever 86 so that tab 82 only engages arm 92, and tab 84 only engages arm 90.

While the above description constitutes the preferred embodiments of the present invention, it will be appreciated that the invention is susceptible to modification, variation and change without department from the proper scope and fair meaning of the accompanying claims.

What is claimed is:

1. In a seat belt retractor of the type having a retractor frame, a spool carried by said frame defined by a belt support shaft and having at least one toothed sprocket, seat belt webbing connected to said spool, a locking bar carried by said frame and movable between an engaged position with said toothed sprocket, thereby inhibiting withdrawal of said webbing, to a disengaged position from said toothed sprocket, thereby permitting withdrawal of said webbing, said retractor further having an inertia sensitive actuator which acts upon said locking bar in response to deceleration forces above a predetermined level to urge said locking bar into said engaged position, the improvement for enabling said seat belt retractor to be operated either as an emergency locking retractor which prevents said seat belt webbing from being withdrawn when said retractor is subjected to deceleration above said predetermined level, or as an automatic locking retractor which permits retraction of said webbing but inhibits withdrawal of said webbing, comprising:

gear retainer means,
gear means disposed in said gear retainer, said gear means driven by rotation of said spool and including a ring gear,
said toothed sprocket being fixed to said shaft,
tab means on said ring gear,
a mode switching lever having a spring arm and being rotatable about a pivot means from an engaged position directly contacting said locking bar and resiliently urging said locking bar into engagement with said toothed sprocket to a disengaged position from said locking bar,
spring means acting on a fixed point on said mode switching lever spring arm to exert an extension force between a mounting point and said mode switching lever spring arm wherein when said mode switching lever is in said engaged position said extension force is directed along one side of a line between said mounting point and said pivot means thereby biasing said mode switching lever in said engaged position, and wherein when said mode switching lever is in said disengaged position said extension force is directed along an opposite side of said line thereby biasing said mode switching lever in said disengaged position whereby rotation of said ring gear causes said tab means to engage said mode switching lever to move said mode switching lever between said engaged and disengaged positions whereby said retractor functions as an automatic locking retractor when said mode switching lever is in said engaged position or an emergency locking retractor when said mode switching lever is in said disengaged position.

2. The seat belt retractor according to claim 1 wherein said gear retainer means comprises a gear retainer and a retainer cover.

3. The seat belt retractor according to claim 1 wherein said gear means includes a drive gear rotatable with said spool.

4. The seat belt retractor according to claim 3 wherein said gear means includes a reduction gear meshing with said drive gear and said ring gear.

5. The seat belt retractor according to claim 1 wherein said mode switching lever includes an extending arm engageable with said locking bar.

6. The seat belt retractor according to claim 1 wherein said mode switching lever includes at least one arm engageable with said tab means.

7. The seat belt retractor according to claim 1 wherein said tab means comprises first and second tabs located on the periphery of said ring gear.

8. The seat belt retractor according to claim 7 wherein said mode switching lever includes first and second tab engaging arms, wherein said first ring gear tab engages said first tab engaging arm to urge said mode switching lever to said engaged position and said second ring gear tab engages said second tab engaging arm to urge said mode switching lever to said disengaged position.

9. The seat belt retractor according to claim 1 wherein said tab means are positioned such that said mode switching lever moves to said engaged position at near full extension of said belt webbing thereby switching said retractor to said automatic locking mode and said mode switching lever moves to said disengaged position at near full retraction of said belt webbing thereby switching said retractor to said emergency locking mode.

10. The seat belt retractor according to claim 1 further comprising a rewind spring assembly mounted directly onto said gear retainer means and engaging said belt support shaft.

11. The seat belt retractor according to claim 10 wherein said gear retainer means is mounted to said frame adjacent one end of said spool and said inertia sensitive actuator is mounted to said frame and adjacent the opposite end of said spool.

12. In a seat belt retractor of the type having a retractor frame, a spool carried by said frame defined by a belt support shaft and having at least one toothed sprocket, seat belt webbing connected to said spool, a locking bar carried by said frame and movable between an engaged position with said toothed sprocket, thereby inhibiting withdrawal of said webbing, to a disengaged position from said toothed sprocket, thereby permitting withdrawal of said webbing, said retractor further having an inertia sensitive actuator which acts upon said locking bar in response to deceleration forces above a predetermined level to urge said locking bar into said engaged position, the improvement for enabling said seat belt retractor to be operated either as an emergency locking retractor which prevents said seat belt webbing from being withdrawn when said retractor is subjected to deceleration above said predetermined level, or as an automatic locking retractor which permits retraction of said webbing but inhibits withdrawl of said webbing, comprising:

gear retainer means, a drive gear carried by said seat belt support shaft for rotation therewith in position coaxially with said belt support shaft said toothed sprocket being fixed to said shaft, a reduction gear meshing with said drive gear, a ring gear meshing with said reduction gear whereby said ring gear rotates with rotation of said drive gear and at a rate of rotation less than that of said drive gear, tab means on said ring gear, a mode switching lever having a spring arm and being rotatable about a pivot means from an engaged position directly contacting said locking bar and resiliently urging said locking bar into engagement with said toothed sprocket to a disengaged position from said locking bar, spring means acting on a fixed point on said mode switching lever spring arm to exert an extension force between a mounting pivot and said mode switching lever spring arm wherein when said mode switching lever is in said engaged position said extension force is directed along one side of a line between said mounting point and said pivot means thereby biasing said mode switching lever in said engaged position, and wherein when said mode switching lever is in said disengaged position said extension force is directed along an opposite side of said line thereby biasing said mode switching lever in said disengaged position whereby rotation of said ring gear causes said tab means to engage said mode switching lever to move said mode switching lever between said engaged and disengaged positions whereby said retractor functions as an automatic locking retractor when said mode switching lever is in said engaged position or an emergency locking retractor when said mode switching lever is in said disengaged position.

13. The seat belt retractor according to claim 12 wherein said gear retainer means comprises a gear retainer and a retainer cover.

14. The seat belt retractor according to claim 12 wherein said switching lever includes an extending arm engageable with said locking bar.

15. The seat belt retractor according to claim 12 wherein said switching lever includes at least one arm engageable with said tab means.

16. The seat belt retractor according to claim 12 wherein said tab means comprises first and second tabs located on the periphery of said ring gear.

17. The seat belt retractor according to claim 16 wherein said switching lever includes first and second tab engaging arms, wherein said first ring gear tab engages said first tab engaging arm to urge said switching lever to said engaged position and said second ring gear tab engages said second tab engaging arm to urge said switching lever to said disengaged position.

* * * * *

UNITED STATES PATENT AND TRADEMARK OFFICE
CERTIFICATE OF CORRECTION

PATENT NO. : 4,767,082

DATED : August 30, 1988

INVENTOR(S) : Timothy J. Schmidt et al.

It is certified that error appears in the above-identified patent and that said Letters Patent is hereby corrected as shown below:

Column 1, line 49, "preferably" should be --preferable--.

Column 4, line 22, "arms" should be --arm--.

Column 6, line 4, "department" should be --departing--.

Column 8, line 20, claim 12, "pivot" should be --point--.

Signed and Sealed this

Twenty-eighth Day of February, 1989

*Attest:*

DONALD J. QUIGG

*Attesting Officer*  *Commissioner of Patents and Trademarks*